Jan. 31, 1967 D. L. KLASS 3,301,786
SYNTHETIC FERROELECTRIC ARTICLES

Filed May 7, 1962

INVENTOR.
DONALD L. KLASS
BY
ATTORNEY

United States Patent Office 3,301,786
Patented Jan. 31, 1967

1

3,301,786
SYNTHETIC FERROELECTRIC ARTICLES
Donald L. Klass, Barrington, Ill., assignor, by mesne assignments, to Union Oil Company of California, Los Angeles, Calif., a corporation of California
Filed May 7, 1962, Ser. No. 192,712
8 Claims. (Cl. 252—63.2)

This invention relates to novel synthetic ferroelectric articles, and to a method of preparing them. The ferroelectric articles of this invention are characterized by the existence of electrical charges of opposite sign at opposite faces thereof.

The synthetic ferroelectric articles of this invention display properties similar to those of electrets but differ from electrets in composition. The synthetic ferroelectric articles of this invention are useful in a variety of electrical instruments, wherever a purely electrostatic field is demanded. For example, they can be used in condenser microphones, and in electrometers.

The ferroelectric articles of this invention are prepared by blending the essential ingredients to form a viscous liquid, and causing the composition to solidify while under the influence of an electric field. The product is a solid, usually disk-shaped object which displays relatively permanent electrostatic charges of opposite sign at the opposite faces thereof.

The invention is best described with reference to the drawings, of which,

Figure 3:
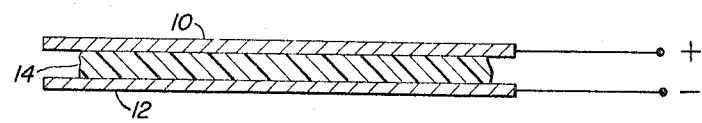
FIGURE 3 illustrates an apparatus for making the ferroelectric articles.

The synthetic ferroelectric articles of this invention have as essential constituents a normally solid vehicle in which particulate solids can be dispersed, and a dispersed solid phase. The vehicle must be one that can be converted to a liquid, or is initially a liquid, to permit blending of the solid phase with the vehicle. The vehicle should have a resistivity of not less than about $10^{12}$ ohms per cubic centimeter, and a dielectric constant not greater than about 15. For example, suitable vehicles include paraffin wax; resins, such as polyethylene, polypropylene, polystyrene, and polybutadiene; and polymerizable monomers, such as styrene, and other liquefiable solids or polymerizable liquids capable in final form of being solid at ambient temperatures and having a hardness at least equivalent to that required to produce an ASTM penetration of about 15 at 77° F. The use of softer materials is to be avoided, since the permanence of the electrostatic charge is reduced when softer materials are used as the vehicle.

The ferroelectric article will consist of at least 10% by volume of dispersed, solid particles selected from the group consisting of silanol silica, barium titanate, and calcium titanate, and mixtures thereof. By silanol silica is meant silica particles having a surface characterized by the presence of silanol groups (silicon-bonded hydroxyl groups). When silica is used, it is preferred that the particles have a surface characterized by the presence of about 6 to 8 silanol groups per square millimicron of surface area. The silica may also be characterized by the

2 presence of free (not chemically bound) water in an amount not in excess of about 4 molecules per square millimicron of silica surface area. The silica may be porous or non-porous, but should have a surface area of not less than about 2 square meters per gram.

The dispersed particulate solid phase should have an average particle size in the range of about 0.1 to 10 microns. The amount of the dispersed particulate matter should be not less than 10% by volume, to insure the existence of electrostatic charges of adequate strength. The article may contain up to as much as 60% dispersed solids, with good results. It is preferred that the solid phase comprise about 20 to 50% by volume of the ferroelectric article.

In the manufacture of the ferroelectric articles of this invention, the vehicle must be in the liquid phase. If a paraffin wax is selected as the vehicle (assuming the wax to have a hardness of not less than that corresponding to ASTM penetration of 15 at 77° F.), then the wax will be heated and thereby converted to a thin liquid. Alternatively, the wax can be liquefied by adding a volatile solvent, which later is evaporated. The solid particles are then blended into the liquid to produce a homogeneous composition. In general, where the amount of solids is in excess of about 15 or 20 volume percent, it will be necessary to add a third ingredient to the composition. The mixture of particulate solids and vehicle will be found to become excessively thick so that it cannot be worked, and it is essential to add a fluidizing ingredient to restore the mass to the liquid state. Suitable fluidizing agents are neutral surfactants such as polyoxyalkene ether, hydroxy ethers, polyhydroxy ethers and esters, $C_2$ to $C_{30}$ mono- or poly-hydric alcohols, as well as neutral sulfonates. Suitable neutral fluidizers include neutral surfactants, such as glycerol monooleate, sorbitan sesquioleate, glycol monooleate, alkaryl polyether alcohols, sodium dialkyl sulfosuccinate, hexylether alcohol, butyl Cellosolve, (trademark for ethylene glycol monobutyl ether), octyl alcohol, and dodecyl alcohol. The neutral surfactant must be added in quantities sufficient to fluidize the mixture of vehicle and solvent, but no more than is necessary to obtain sufficient fluidity should be used. Thus, the minimum amount necessary to provide fluidity should be added, if, indeed, any fluidizer is employed at all. The amount added will seldom exceed about 25 percent by volume except if silicas of extremely high porosity are employed in large volume fractions. The exact amount of fluidizer employed will depend upon the volume of solids added to the vehicle, and can best be determined empirically.

Where the vehicle consists of a polymersizable liquid monomer, such as styrene, the same procedure is followed as for heat-liquefiable materials, such as waxes, except of course that no heat is required. The ingredients are throughly blended in the liquid state to provide a homogeneous composition. The composition is then subjected to an electric field and solidified. This is best accomplished by disposing a relatively thin layer of the composition between two electrodes, as shown in FIGURE 3. Electrode 10 is connected to the positive of a potential source, and electrode 12 to the negative. A thin layer 14 of the blended composition is disposed between the electrodes, which are in fact flat plates. The liquid composition is then permitted or caused to solidify while under the influence of the electric field, as by the cooling of a wax vehicle or the polymerization of a liquid monomer vehicle. A permanently polarized solid product results. By permanent is meant that the electrostatic charge is not a surface charge, and cannot be removed by electrically connecting the charged surfaces of the ferroelectric article, or by touching a conducting object to the ferroelectric article. The articles will remain charged for many days, or even many years. The permanency of the electrostatic field is demonstrated by the fact that the articles are best preserved at maximum field strength by disposing flat conductive surfaces adjacent to the two charged surfaces of the article, and electrically connecting the conductive surfaces together. This acts in a manner analogous to that of a keeper employed with a magnet.

Figure 1:
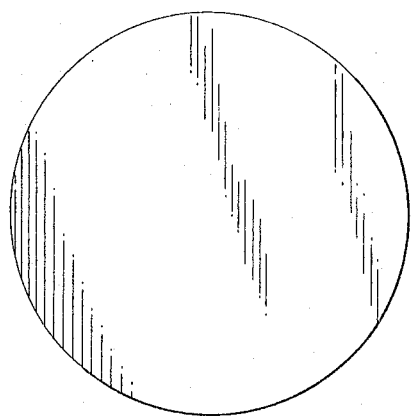
FIGURE 1 is a plan view of the product ferroelectric article.
Figure 2:
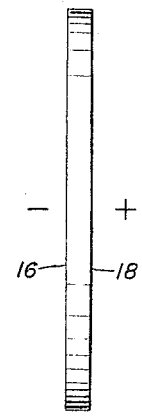
FIGURE 2 is an elevational view of the article of FIGURE 1.

The articles need not be of any particular shape, but are usually flat and disk-shaped, as shown in FIGURES 1 and 2. The flat surfaces of the disk 16 and 18 are the surfaces which were adjacent to electrodes 10 and 12, respectively. In manufacture, the electrodes may be coated with a thin layer of a material adapted to permit easy separation of the electrodes from the finished article, or the electrodes may be made of thin tin leaf, so that they may be pealed from the surfaces of the product article.

As a specific example of the manufacture of ferroelectric articles in accordance with this invention, a formulation consisting of silica specially pretreated by contact with gaseous ammonia; glycerol monooleate, and micro-crystalline wax was prepared. The composition of the formula was:

*Example 1*

| | Grams |
|---|---|
| Pretreated silica | 55.3 |
| Glycerol monooleate | 17.8 |
| Microcrystalline wax | 25.5 |

The silica was blended into a hexane solution of the glycerol monooleate and wax, and the slurry was evaporated to a slush on the stream bath and milled through a 3-roll mill until the composition reached a constant weight and all the hexane had been volatilized. The resulting mixture was a dry solid. Slabs of the solid about 1/16 of an inch thick were cast by pressing the warmed solid between tin plate sheets. The tin plate had been coated with a release agent to facilitate separation of the slab. A one-inch-square slab was then placed between two electrodes, and the sandwich was placed in an oven and heated at 72° C. for one hour. A potential of 1200 volts D.C. was then applied, and the slab allowed to cool slowly under the influence of the electric field. After the sandwich had cooled, about 2 hours, the field was removed. The electrodes were separated from the finished article which evidenced a positive electrostatic charge on one side thereof and a negative charge on the other, as measured with a gold leaf electroscope. The charge was not merely a surface charge, because scraping of the article with a knife did not remove the charge, although a thin layer of the composition itself was removed.

As another example of the method of this invention a similar experiment was carried out with the following compositions using the same procedure as in Example 1.

*Example 2*

| | Grams |
|---|---|
| Paraffin wax | 28.5 |
| Glycerol monooleate | 5.6 |
| 1-aminoethyl 2-heptadecenyl imidazoline | 10.1 |
| Ethylene glycol | 4.0 |
| Silica | 50.6 |

This composition was subjected to 1200 volts D.C. at 41° C. for 1 hour with the same results as in Example 1.

Ferroelectric articles may be made which will exhibit permanent electric charges as aforedescribed, using an applied potential of suitable amplitude. While the magnitude of the applied charge is not critical, best results are obtained when the article solidifies under high potentials, and it is especially preferred that the potential be about 10 kilo-volts per centimeter, which is slightly higher than the potentials used in the foregoing examples.

The embodiments of the invention in which an exclusive property or privilege is claimed are defined as follows:

1. A ferroelectric article consisting essentially of a solidified composition of particulate solids dispersed in a vehicle and exhibiting electric charges of opposite sign at opposite surfaces thereof, said composition consisting essentially of:
   (a) from about 10–60 percent by volume of solid particles of silanol silica, said particles having an average particle size in the range of about 0.1 to 10 microns diameter, and
   (b) the remainder being a vehicle selected from the group consisting of paraffin wax, microcrystalline wax, polyethylene, polypropylene, polystyrene and polybutadiene, said vehicle being further characterized as being a solid having a resistivity of not less than about $10^{12}$ ohms per cubic centimeter, a dielectric constant not in excess of about 15, an ASTM penetration not in excess of about 15 at 77° F., and being capable of fluidity at the time said solid particles are dispersed therein.

2. An article in accordance with claim 1 including up to about 25 percent by volume of a surface active fluidizer selected from the group consisting of polyoxyalkylene ethers, $C_2$–$C_{30}$ monohydric alcohols, $C_2$–$C_{30}$ polyhydric alcohols, glycerol monooleate, alkaryl polyether alcohols, sodium dialkyl sulfosuccinate, ethylene glycol monobutyl ether, octyl alcohol and dodecyl alcohol.

3. An article in accordance with claim 1 wherein the surfaces of said silica particles are characterized by the presence of about 6 to 8 silanol groups per square millimicron of surface area and not in excess of about 4 molecules of free water per square millimicron of silica surface area.

4. An article in accordance with claim 1 wherein said vehicle is paraffin wax.

5. An article in accordance with claim 1 wherein said vehicle is microcrystalline wax.

6. The method of preparing a ferroelectric article consisting of:
   (a) blending together
      (1) from about 10–60 percent by volume of solid particles of silanol silica, said particles having an average particle size in the range of about 0.1 to 10 microns diameter,
      (2) from 0 to 25 percent by volume of a surface active fluidizer selected from the group consisting of polyoxyalkylene ethers, $C_2$–$C_{30}$ polyhydric alcohols, $C_2$–$C_{30}$ monohydric alcohols, glycerol monooleate, sorbitan sesquioleate, glycol monooleate, alkaryl polyether alcohols, sodium dialkyl sulfosuccinate, ethylene glycol monobutyl ether, octyl alcohol and dodecyl alcohol,
      (3) the remainder of a liquid vehicle selected from the group consisting of paraffin wax, microcrystalline wax, polyethylene, polypropylene, polystyrene and polybutadiene, said vehicle being further characterized in having a resistivity of not less than about $10^{12}$ ohms per cubic centimeter, a dielectric constant not in excess of about 15, and an ASTM penetration not in excess of about 15 at 77° F.,
   (b) mixing the aforementioned ingredients to produce a homogenous composition,
   (c) placing said composition in contact with two electrodes, (d) applying across said electrodes an electric potential of about 10 kilo-volts per centimeter of said composition for a period of about 1–2 hours, and (e) causing said vehicle to solidify while under the influence of said applied potential.

7. The method in accordance with claim 6 in which said vehicle is a melted paraffin wax, and said composition is solidified by cooling.

8. The method in accordance with claim 6 in which said vehicle is a melted microcrystalline wax.

References Cited by the Examiner

UNITED STATES PATENTS

| | | | |
|---|---|---|---|
| 2,736,668 | 2/1956 | Broge | 106—308 |
| 2,776,898 | 1/1957 | Day et al. | 106—39 |
| 2,791,705 | 5/1957 | Vieweg | 260—41 XR |
| 2,866,716 | 12/1958 | Broge | 252—308 |
| 2,892,107 | 6/1959 | Williams et al. | 252—62.9 |
| 2,974,203 | 3/1961 | Flaschen et al. | 252—62.9 |
| 2,986,524 | 5/1961 | Padgett | 252—63.2 |
| 2,987,482 | 6/1961 | Oliva | 252—63.2 |

OTHER REFERENCES

Wiseman et al.: "Electrets," Electrical Engineering, October, 1953, p. 869–872.

LEON D. ROSDOL, *Primary Examiner.*

JULIUS GREENWALD, *Examiner.*

S. R. BRESCH, J. D. WELSH, *Assistant Examiners.*